(No Model.)

I. A. KILMER.
PISTON PACKING.

No. 503,860. Patented Aug. 22, 1893.

Witnesses:
Raphaël Netter
Ernest Hopkinson

Inventor
Irving A. Kilmer
by Duncan & Page,
Attorneys.

UNITED STATES PATENT OFFICE.

IRVING A. KILMER, OF NEWBURG, NEW YORK.

PISTON-PACKING.

SPECIFICATION forming part of Letters Patent No. 503,860, dated August 22, 1893.

Application filed February 20, 1893. Serial No. 462,957. (No model.)

*To all whom it may concern:*

Be it known that I, IRVING A. KILMER, of Newburg, in the county of Orange and State of New York, have invented a new and useful Improvement in Piston-Packing, of which the following is a specification.

The invention relates to that class of pistons in which the packing is effected by the use of one or more split rings; and it relates more particularly to means for protecting from lateral torsion the spiral springs that are used for holding the rings in their expanded condition.

There are some advantages in so building a piston that the ring is free to rotate in the peripheral groove in which it is seated. Such movement tends especially to distribute the wear of the ring equally upon all parts of the cylinder. But where such circumferential movement of the ring is permitted, it brings a strong lateral strain on the spring if the base of the spring is fixed in the immovable part of the piston so that the ring moves past the top of the spring. Such strain tends to weaken the spring and ultimately to break it.

It is the object of the present invention to avoid this difficulty. I propose to introduce a series of segmental blocks in the annular space behind the ring or rings, and to seat the springs in these blocks. One or more of the blocks are to be connected with the ring so as to move with it; and the several blocks abut end to end, so that when one moves all must move. It thus follows that the ring, the blocks and the springs form a system, all parts of which move together, and thereby the springs are relieved from strain.

The invention is illustrated in the accompanying drawings, in which—

Figure 1:
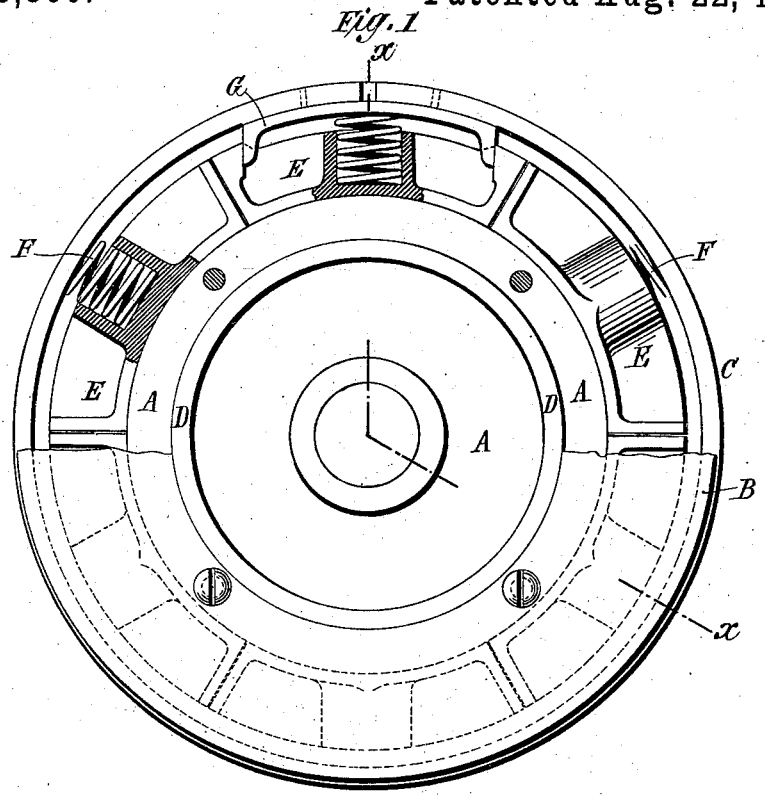
Figure 2:
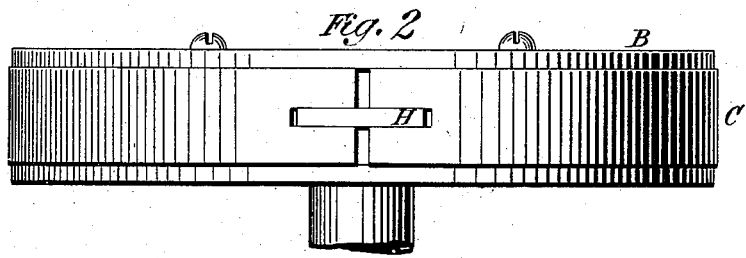
Figure 3:
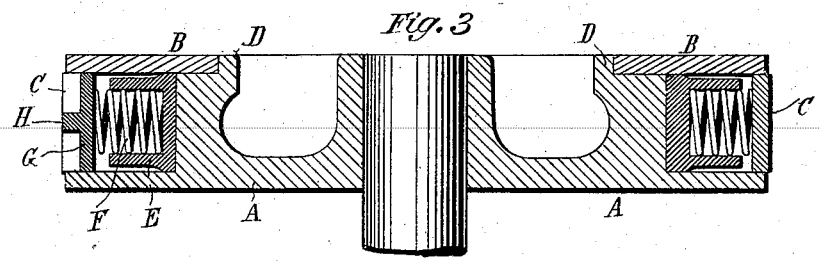

Figure 1 is a plan view of a piston embodying the invention, the follower being removed. Fig. 2 is a cross-section on the dotted line *x—x* of Fig. 1; and Fig. 3 is a side view in elevation.

Referring to the drawings, A is the body of the piston, B the follower, and C the split ring. D is a circular shoulder formed in the body of the piston, and between this and the ring is arranged a series of segmental blocks, E E, which are provided with sockets for seating the spiral springs F. One face of these blocks is made circular so as to fit accurately the face of the circular shoulder D, thus permitting the blocks to slide easily along such shoulder. In the case of that one of the blocks which is opposite the cut in the ring, there should be interposed between the spring and the ring a bridge-piece G, shaped to bear against the inner face of the ring and provided on its outer face with a circumferential rib H, adapted to fit into notches in the ends of the ring to cut off the passage of steam. The width of this piece G should be equal to that of the ring; and it should be so constructed as to interlock with its companion block E so that the two will move in unison. From the above construction, it follows that any circumferential movement of the ring is communicated to the bridge-piece G, and through this to the whole series of abutting blocks E with their contained springs. It results that no lateral torsion is put on the springs by the rotation of the ring.

While only one split ring is shown in the drawings, it is evident the same plan of construction would be applicable to a piston in which two or more rings are used.

Besides the utility above named, there is this further utility resulting from the use of the segmental blocks as a seat for the springs. It is old in the art to seat the spiral springs in radial sockets cast or drilled in the solid body part of the piston, but the casting or drilling of these sockets (especially if they are cylindrical, as they should be, in order to fit the springs) is troublesome and expensive. It is, however, a much easier matter to cast the body of the piston with a shoulder D, as shown in the drawings, the sockets for the springs being formed in the segmental blocks which are cast separately from the piston. When such blocks are assembled with the other parts, they furnish as good a support for the base of the springs as if the sockets were formed in the solid body of the piston itself. This last-named advantage in the use of the interposed segmental blocks would be present even if the packing ring or rings were not left free to rotate.

What is claimed as new is—

1. The combination in a piston packing of a split ring, spiral springs bearing outwardly against the ring, and a series of spring carrying segmental blocks interposed between said springs and the fixed parts of the piston, and engaging the ring, so that the ring, blocks and springs will rotate in unison, as set forth.

2. The combination with the split ring or rings of a piston packing, and the body portion of the piston, of segmental blocks seated in the body portion and formed with sockets on their outer faces, and radially arranged spiral springs interposed between the ring and the blocks, and seated in said sockets, as set forth.

IRVING A. KILMER.

Witnesses:
MELVIN D. KILMER,
EDWARD DAVIS.